(12) United States Patent
Millman et al.

(10) Patent No.: US 7,313,290 B2
(45) Date of Patent: Dec. 25, 2007

(54) METHOD FOR IMPROVING THE VIEWING OF SMALL ICONS AND SMALL TEXT ON HIGH RESOLUTION DISPLAYS

(75) Inventors: Steven E. Millman, Spring Valley, NY (US); Kai R. Schleupen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/643,175

(22) Filed: Aug. 18, 2003

(65) Prior Publication Data

US 2005/0052475 A1    Mar. 10, 2005

(51) Int. Cl.
*G06K 9/32* (2006.01)
*G06K 9/40* (2006.01)
*G06T 17/00* (2006.01)
*G09G 5/00* (2006.01)

(52) U.S. Cl. .......... 382/299; 382/293; 382/269; 345/428; 345/606; 345/660

(58) Field of Classification Search ......... 382/269, 382/293, 298–300; 345/428, 603, 606, 608–611, 345/660, 661, 948
See application file for complete search history.

(56) References Cited

U.S. PATENT DOCUMENTS

| 5,420,605 | A | * | 5/1995 | Vouri et al. ............. 345/698 |
| 5,612,715 | A | * | 3/1997 | Karaki et al. ........... 345/698 |
| 5,926,166 | A | * | 7/1999 | Khederzadeh et al. ... 345/581 |
| 7,142,226 | B2 | * | 11/2006 | Sakuta et al. .......... 345/690 |

* cited by examiner

*Primary Examiner*—Matthew C. Bella
*Assistant Examiner*—Wes Tucker
(74) *Attorney, Agent, or Firm*—F. Chau & Associates, LLC

(57) ABSTRACT

When run on high pixel density monitors, software applications, which are written to be legible at all resolutions benefit greatly from the high pixel density. Other applications, especially those containing resources whose dimensions and placement are described in terms of numbers of pixels (e.g., a bitmap, text), may have reduced legibility. A method is described which facilitates legibility of both classes of software applications when run on high pixel density monitors.

16 Claims, 2 Drawing Sheets

METHOD FOR IMPROVING THE VIEWING OF SMALL ICONS AND SMALL TEXT ON HIGH RESOLUTION DISPLAYS

BACKGROUND OF THE INVENTION

1. Field of the Invention

The present invention relates to high resolution displays, and, more particularly, to improving legibility of software applications displayed on high resolution displays.

2. Description of the Related Art

High resolution displays currently being sold can have pixel densities around 200 pixels per inch (PPI). For example, the IBM T221 has a pixel density of 204 PPI. Software applications written to be legible at all resolutions benefit greatly from the higher pixel density. Many applications, however, are written under the assumption of a 96 PPI display, which is typical in lower resolution displays. For example, an application may include resources whose dimensions and placement are described in terms of the number of pixels (e.g., a bitmap, text). The problem is that legacy applications written under the assumption of the lower resolution displays suffer from reduced legibility when displayed on the high resolution displays. In particular, icons and text of the legacy applications may be displayed too small to be easily legible to the human eye.

Microsoft has drafted an article, H. Kramer, Microsoft Corp., *How to Write High DPI Applications (GDU Technical Articles)*, published March 2001, which details the steps necessary to properly write applications for high resolution displays. However, because the vast amount of applications already written do not take the article's suggestions into account, a legibility issue still exists when these applications are displayed on high resolution displays.

Furthermore, the current standard of practice for changing screen resolution is to change the settings for the operating system. For example, in the Microsoft Windows operating system, a user must enter a "control panel" and choose from several menu options several levels deep to change the screen resolution. Such a practice is often time-consuming and inefficient, especially if the user desires to toggle between resolutions frequently.

Therefore, a need exists for an efficient method that legibly displays applications written for lower resolution displays on high resolution displays.

SUMMARY OF THE INVENTION

In one embodiment of the present invention, a method for improving the legibility of an application written for a lower pixel density monitor and displayed on a higher pixel density monitor, wherein the screen resolution of the higher pixel density monitor is set to a native resolution, is provided. The method includes waiting for a first input signal from a user and programmatically changing the screen resolution in one atomic step from the native resolution to a lower resolution in response to the first input signal. The native resolution is at least 33% greater in pixel density than the lower resolution.

In another embodiment of the present invention a system for improving the legibility of an application written for a lower pixel density monitor and displayed on a higher pixel density monitor, wherein the screen resolution of the higher pixel density monitor is set to a native resolution, is provided. The system includes means for waiting for a first input signal from a user and means for programmatically changing the screen resolution in one atomic step from the native resolution to a lower resolution in response to the first input signal. The native resolution is at least 33% greater in pixel density than the lower resolution.

In yet another embodiment of the present invention, a machine-readable medium having instructions stored thereon for execution by a processor to perform a method for improving the legibility of an application written for a lower pixel density monitor and displayed on a higher pixel density monitor, wherein the screen resolution of the higher pixel density monitor is set to a native resolution, is provided. The method includes waiting for a first input signal from a user, and programmatically changing the screen resolution in one atomic step from the native resolution to a lower resolution in response to the first input signal. The native resolution is at least 33% greater in pixel density than the lower resolution.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
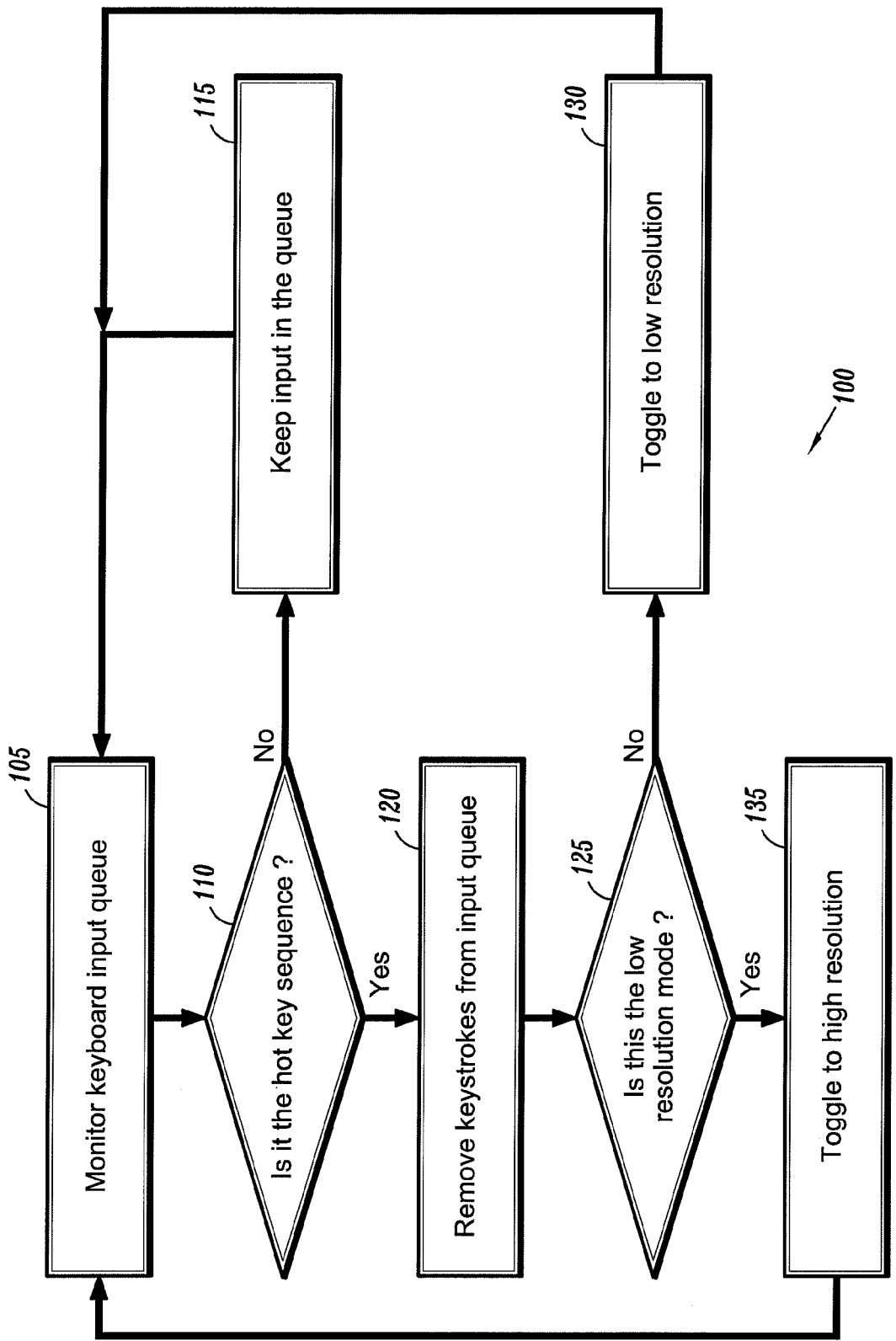
FIG. 1 is a flow diagram of a method for improving the legibility of applications written for lower resolution displays, in accordance with one illustrative embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachers herein, one of ordinary skill in the related art will be able to contemplate these and similar implementations of the present invention.

A method is described which facilitates legibility of software applications written for lower resolution displays. The method achieves this legibility problem by allowing a user to toggle to a lower resolution mode by means of a hot key sequence. For example, the IBM T221 monitor has a native resolution mode of 3840×2400 pixels. By toggling the monitor to a mode of 1920×1200 pixels, the pixel density is reduced in half to 102 PPI. Because the 102 PPI density is very close to the 96 PPI assumption that many legacy applications written for lower resolution displays presuppose, legibility of the applications would not be an issue even though they are displayed on the high resolution monitor. When the user wishes to return to the native resolution, the user may invoke the hot key sequence again. As described in greater detail below, the hot key sequence provides an efficient way for the user to change resolutions, without going through the time-consuming and inefficient procedure of changing the settings in the operating system. Once the hot key sequence is entered by the user, the present invention programmatically completes the task of changing screen resolutions without further user intervention. As a result, the user views the process of changing resolutions in one atomic step (i.e., entering the hot key sequence). As used in the present invention, the phrase "one atomic step" refers to the process of changing resolutions without interleaving access by other processes and/or further intervention by the user.

To display an application written for a lower resolution monitor on a high resolution monitor, at least a primitive scaling function is needed such that in 1920×1200 mode, for example, each pixel would be replicated to a 2×2 block of pixels on the high resolution monitor. A scaling function is commonly found on all currently manufactured monitors. In an alternate embodiment, the scaling function may be replicated in software for an application or a display device driver, for example.

The present invention allows either the manufacturer of the software and/or the user to choose two resolutions modes to toggle between: a high resolution mode and a low resolution mode. In an alternate embodiment, more than two resolution modes may be provided. However, allowing the user to toggle among more than two resolution modes may require the user to scroll through multiple screen resolutions and/or define multiple hot key sequences. Such effort takes away from the simplicity and convenience provided by the present invention. Thus, the present invention is advantageously performed when a user is required to toggle between only two resolution modes. In most cases, the high resolution mode will typically be the native resolution of the high resolution monitor. The low resolution mode is preferably a resolution reasonably close to the 96 PPI resolution to which most legacy applications are written. The higher resolution mode may be at least 33% greater in pixel density than the lower resolution mode.

To detect the performance of a hot key sequence, a system wide hook that monitors all keyboard activity can be installed via a user mode application. For example, in the Microsoft Windows family of operating systems, a standard user application can install a system wide hook with the help of a dynamically linked library file (DLL). Although each user mode process is given its own memory address space separate from all other processes, to prevent one process from inadvertently changing the values stored by another process, the same DLL software code is loaded in the memory address space of all processes. Since most DLL software code is generally read and not written to, the memory occupied by the DLL is marked read only, and a separate copy of the DLL (or a section of the DLL) is made in the process's memory space only if it is written to. Accordingly, a resolution changer DLL for monitoring keyboard activity can be implemented in the present invention. The system wide hook inserts the resolution changer DLL in the memory address space of all processes. Through the resolution changer DLL, it is programmatically possible to monitor essentially all keyboard activity which is sent to any user mode process.

In some cases, the hot key sequence of the present invention may already be used by another user mode program, for example, a foreground process. For example, consider a word processing application having the same hot key sequence as the present invention. When the user attempts to use the word processor application hot key sequence to perform some application specific task, the system wide hook will first see the sequence and instead toggle the resolution. Although no catastrophic effect has occurred, the user has not achieved the desired result of performing the application specific task. To resolve this issue, the present invention may allow the user to dynamically change the hot key sequence. This may be necessary, for example, if another user mode application is already using the default or current hot key sequence. To facilitate a changeable hot key sequence, the memory location where the user-defined hot key sequence is stored may be made shareable across all processes. Even though a change in the hot key sequence may write to the memory occupied by the DLL, a separate copy of the DLL (or the section of the DLL) will not be made and all processes will see the new hot key sequence. J. Richter, Advanced Windows (3rd Ed.), Microsoft Press, 1997, pages 566-569 provides an exemplary methodology for sharing a memory location across all processes.

Some operating systems do not provide a user mode mechanism (e.g., the system wide hook) for monitoring user input. In such a case, a kernel mode driver may be implemented for monitoring keyboard activity. Furthermore, for convenience of implementation, a user mode application may be written to retrieve data from the kernel mode driver and toggle the resolution.

Referring now to FIG. 1, a method 100 for improving the legibility of applications written for lower resolution displays is illustrated, in accordance with one embodiment of the present invention. A keyboard input queue (not shown) may be implemented for storing keystrokes entered by a user. The method monitors (at 105) the keyboard input queue for the presence of a hot key sequence. In one embodiment, the hot key sequence is a single keystroke. In an alternate embodiment, the hot key sequence involves more than one keystroke. Each keystroke entered by the user is compared to a corresponding key in the hot key sequence. For example, the first keystroke is compared to the first key in the hot key sequence. Only if the first keystroke entered matches the corresponding first key in the hot key sequence, is the next keystroke checked as to whether it compares to the next key in the hot key sequence.

The keyboard input queue is checked (at 110) to see whether the keyboard input queue contains the hot key sequence. If the keyboard input queue does not contain the hot key sequence, the keystrokes in the keyboard input queue are kept (at 115) in the keyboard input queue and the method continues to monitor (at 105) the keyboard input queue for more keystrokes entered by the user. If the keyboard input queue contains the hot key sequence, the keystrokes in the keyboard input queue are removed (at 120), thus clearing the keyboard input queue of the keystrokes.

The method determines (at 125) whether the current resolution mode for the monitor is a low resolution mode. If the monitor is not in a low resolution mode (i.e., the monitor is in a high resolution mode), the method toggles (at 130) the monitor to a low resolution mode. If the monitor is in a low resolution mode, the method toggles (at 135) the monitor to a high resolution mode. After the monitor's resolution is toggled (at 130 or 135), the method loops to the beginning and resumes monitoring (at 105) the keyboard input queue for keystrokes entered by the user. It is understood that one or more threads may store more keystrokes in the keyboard input queue while a current thread is processing the keystrokes already in the keyboard input queue. However, the OS may guarantee that the keystrokes will first be monitored by the system wide hook prior to being sent to a foreground process, for example.

In an alternate embodiment, prior to toggling (at 130 or 135) the resolution, the method may check the current resolution of the monitor to see whether it matches either the high resolution mode or the low resolution mode. If there is no match, the method may decide to abort further processing and/or display a message box on the screen advising the user of the problem. The method may also decide to change the current resolution to either the high resolution mode or the low resolution mode. In one embodiment, the method may change the current resolution to the high resolution mode if the difference between the current resolution and the high resolution mode is greater than the difference between the current resolution and the low resolution mode. Similarly, the method may change the current resolution to the low resolution mode if the difference between the current resolution and the low resolution mode is greater than the difference between the current resolution and the high resolution mode.

Figure 2:
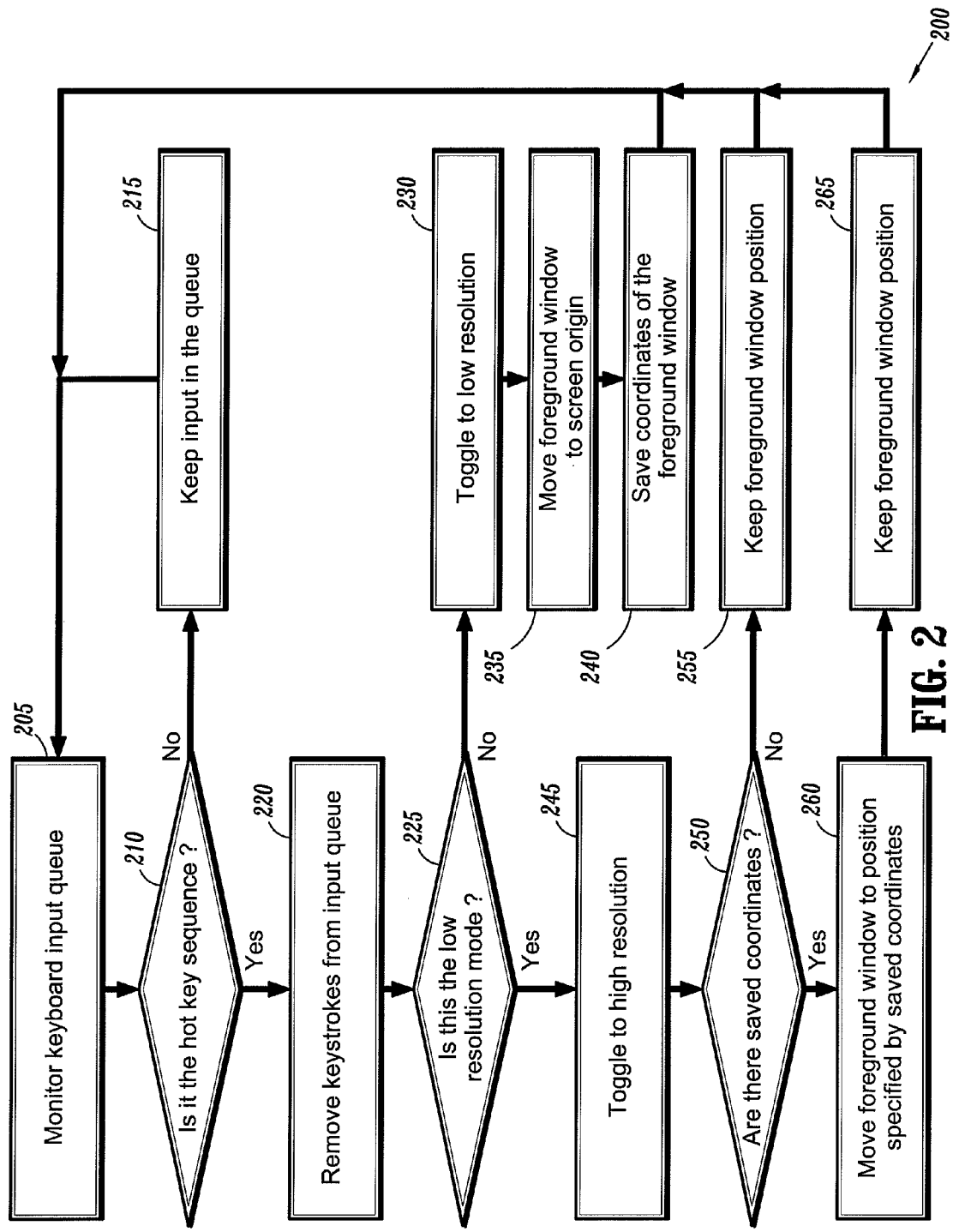
FIG. 2 is a flow diagram a method for improving the legibility of applications written for lower resolution displays, in accordance with another illustrative embodiment of the present invention.

Referring now to FIG. 2, a preferred embodiment of a method 200 for improving the legibility of applications written for lower resolution displays is illustrated. Similar to FIG. 1, the method monitors (at 205) the keyboard input queue for the presence of a hot key sequence. The keyboard input queue is checked (at 210) to see whether the keyboard input queue contains the hot key sequence. If the keyboard input queue does not contain the hot key sequence, the keystrokes in the keyboard input queue are kept (at 215) in the keyboard input queue and the method continues to monitor (at 205) the keyboard input queue for more keystrokes entered by the user. If the keyboard input queue contains the hot key sequence, the keystrokes in the keyboard input queue are removed (at 220).

In a typical windows-based operating system, it is a reasonable assumption that the user entered the hot key sequence to switch to low resolution mode because the user wishes to obtain greater legibility for the window in the foreground (i.e., a foreground window). The application running in the foreground window is the application which, by default for most windows-based operating systems, receives all of the user's keyboard input and mouse clicks. By default of most windows-based operating systems and assuming that the foreground window does not cover the entire screen, when the resolution is changed programmatically to a lower resolution mode, the operating system moves the origins of all the windows such that at least a small portion of each window is visible at the lower resolution. However, because the user will probably want to see as much of the foreground window as possible, the user will be forced to manually move the position of the window. Thus, it is advantageous to move the foreground window to the screen origin without user intervention. For example, if the screen origin is located in the upper left portion of the screen, the foreground window will be moved to the upper left portion of the screen. By moving the foreground window to the screen origin, the maximum area of the foreground window becomes viewable to the user. Once the user is finished with the foreground window, the user can enter the hot key sequence again and return to high resolution mode. In one embodiment, the original coordinates of the foreground window are saved for future use. Utilizing the original coordinates, the foreground window can return to its original location prior to returning to high resolution mode.

Referring again to FIG. 2, the method determines (at 225) whether the current resolution mode for the monitor is a low resolution mode. If the monitor is not in a low resolution mode (i.e., the monitor is in a high resolution mode), the method toggles (at 230) the monitor to a low resolution mode. The method moves (at 235) the foreground window to the screen origin. The method saves (at 240) the original coordinates of the foreground window. The original coordinates may be saved, for example, in a hard drive. The method loops to the beginning and resumes monitoring (at 105) the keyboard input queue for keystrokes entered by the user.

If the monitor is in a low resolution mode, the method toggles (at 245) the monitor to a high resolution mode. After the monitor's resolution is toggled (at 130 or 135), the method determines (at 250) whether saved coordinates exist. If the saved coordinates do not exist, the foreground window is kept (at 255) in the same position. If the saved coordinates exist, the foreground window is moved (at 260) to a position specified by the saved coordinates and the saved coordinates are discarded (at 265). The method loops to the beginning and monitors (at 105) the now empty keyboard input queue for keystrokes entered by the user.

In an additional embodiment, a unique identifier of the foreground window may be stored along with the original coordinates. For example, the unique identifier of the foreground window may be its windows handle. Thus, even if the user has changed the foreground window to a different window while in low resolution mode, the previous foreground window can be identified and restored to its former position using the unique identifier, when the user toggles back to high resolution mode.

Although the hot key sequence is previously described as one or more keystrokes entered by the user, it is understood that the hot key sequence may include data from any of a variety of input devices known to those skilled in the art. This includes, but is not limited to, a mouse, a tablet, a microphone, and the like. It is also contemplated that the hot key sequence may be implemented by either rewriting the input device driver or filtering the data from the input device.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for improving the legibility of an application written for a lower pixel density monitor and displayed on a higher pixel density monitor, wherein the screen resolution of the higher pixel density monitor is set to a native resolution, the method comprising the steps of:

receiving a first input signal from a user, the first input signal comprising a user request to change the screen resolution;

saving original coordinates of a foreground window in response to the first input signal; and programmatically changing the screen resolution in one atomic step from the native resolution to a lower resolution in response to the first input signal;

wherein the native resolution is at least 33% greater in pixel density than the lower resolution;

wherein programmatically changing the screen resolution in one atomic step from the native resolution to a lower resolution in response to the first input signal comprises:

determining if the native resolution is a first resolution; and if the native resolution is the first resolution, changing the screen resolution in one atomic step from the native resolution to the lower resolution in response to the first input signal;

and wherein the method further comprises:

determine a first difference between the native resolution and the first resolution;

determine a second difference between the native resolution and the lower resolution;

if the first difference is greater than the second difference, changing the screen resolution in one atomic step from the native resolution to the first resolution; and if the second difference is greater than the first different, changing the screen resolution in one atomic step from the native resolution to the lower resolution.

2. The method of claim 1, further comprising the steps of:

receiving a second input signal from a user; and progranmiatically changing the screen resolution in one atomic step from the lower resolution to the native resolution in response to the second input signal.

3. The method of claim 1, wherein receiving a first input signal from a user comprises monitoring a keyboard input queue.

4. The method of claim 3, wherein monitoring a keyboard input queue comprises:

determining whether the keyboard input queue contains the first input signal; and removing the first input signal from the keyboard input queue in response to the first input signal.

5. The method of claim 2, wherein receiving a second input signal from a user comprises the step of monitoring a keyboard input queue.

6. The method of claim 5, wherein monitoring a keyboard input queue comprises:

determining whether the keyboard input queue contains the second input signal; and removing the first input signal from the keyboard input queue in response to the second input signal.

7. The method of claim 1, wherein receiving a first input signal from a user comprises receiving a hot key sequence.

8. The method of claim 2, wherein receiving a second input signal from a user comprises receiving a hot key sequence.

9. The method of claim 2, further comprising the steps of:

moving the foreground window to a screen origin in response to the first signal.

10. The method of claim 9, further comprising the steps of:

moving the foreground window to the position specified by the original coordinates in response to the second signal; and discarding the original coordinates.

11. The method of claim 2, further comprising the steps of:

moving a foreground window to a screen origin in response to the first signal;

saving original coordinates of the foreground window in response to the first signal; and storing a unique identifier of the foreground window.

12. The method of claim 11, further comprising the steps of:

moving the foreground window identified by the unique identifier to the position specified by the original coordinates in response to the second signal; and discarding the original coordinates and the unique identifier.

13. A method for improving the legibility of an application written for a lower pixel density monitor and displayed on a higher pixel density monitor, wherein the screen resolution of the higher pixel density monitor is set to a native resolution, the method comprising the steps of:

receiving a first input signal from a user, the first input signal comprising a user request to change the screen resolution;

saving original coordinates of a foreground window in response to the first input signal; and programmatically changing the screen resolution in one atomic step from the native resolution to a lower resolution in response to the first input signal;

wherein the native resolution is at least 33% greater in pixel density than the lower resolution;

the method further comprising the steps of:

receiving a second input signal from a user; and programmatically changing the screen resolution in one atomic step from the lower resolution to the native resolution in response to the second input signal;

wherein programmatically changing the screen resolution in one atomic step from the lower resolution to the native resolution in response to the second input signal comprises:

determining if the lower resolution is a second resolution; and if the lower resolution is the second resolution, changing the screen resolution in one atomic step from the lower resolution to the native resolution in response to the second input signal;

wherein programmatically changing the screen resolution in one atomic step from the lower resolution to the native resolution in response to the second input signal comprises:

determining if the lower resolution is a second resolution; and if the lower resolution is the second resolution, changing the screen resolution in one atomic step from the lower resolution to the native resolution in response to the second input signal;

the method further comprising:

determining a first difference between the lower resolution and the second resolution; determine a second difference between the lower resolution and the native resolution;

if the first difference is greater than the second difference, changing the screen resolution in one atomic step from the lower resolution to the second resolution; and if the second difference is greater than the first difference, changing the screen resolution in one atomic step from the lower resolution to the native resolution.

14. A machine-readable medium having instructions stored thereon for execution by a processor to perform a method for improving the legibility of an application written for a lower pixel density monitor and displayed on a higher pixel density monitor, wherein the screen resolution of the higher pixel density monitor is set to a native resolution, the method comprising the steps of:

receiving a first input signal from a user, the first input signal comprising a user request to change the screen resolution;

saving original coordinates of a foreground window in response to the first signal; and programmatically changing the screen resolution in one atomic step from the native resolution to a lower resolution in response to the first input signal;

wherein the native resolution is at least 33% greater in pixel density than the lower resolution;

wherein programmatically changing the screen resolution in one atomic step from the native resolution to a lower resolution in response to the first input signal comprises:

determining if the native resolution is a first resolution; and if the native resolution is the first resolution, changing the screen resolution in one atomic step from the native resolution to the lower resolution in response to the first input signal;

and wherein the method further comprises:

determine a first difference between the native resolution and the first resolution;

determine a second difference between the native resolution and the lower resolution;

if the first difference is greater than the second difference, changing the screen resolution in one atomic step from the native resolution to the first resolution; and if the second difference is greater than the first different, changing the screen resolution in one atomic step from the native resolution to the lower resolution.

15. The method of claim 1, wherein programmatically changing the screen resolution in one atomic step from the native resolution to a lower resolution in response to the first input signal comprises programmatically changing the screen resolution without interleaving access by another process from the native resolution to a lower resolution in response to the first input signal.

16. The method of claim 1, wherein programmatically changing the screen resolution in one atomic step from the native resolution to a lower resolution in response to the first input signal comprises programmatically changing the screen resolution without further user intervention from the native resolution to a lower resolution in response to the first input signal.

* * * * *